Sept. 27, 1932.  C. PONTOPPIDAN  1,879,474
FILTRATION OF SUSPENDED SEDIMENTS
Filed Nov. 7, 1930   2 Sheets-Sheet 1
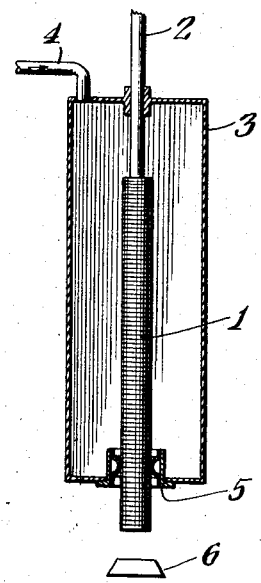
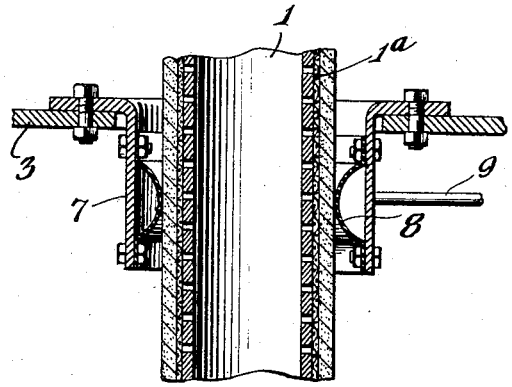
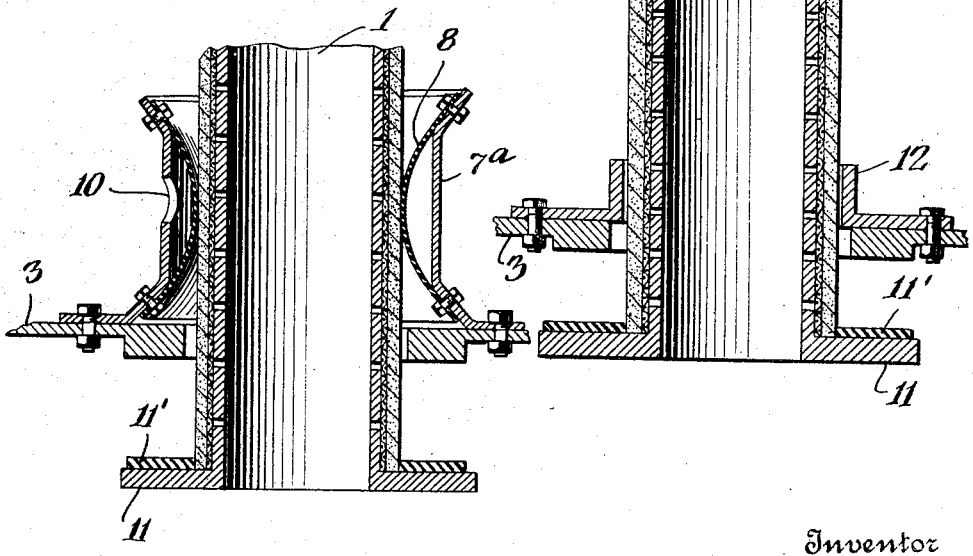
Inventor
Carl Pontoppidan
By his Attorneys
Redding, Greeley, O'Shea & Campbell Sept. 27, 1932. C. PONTOPPIDAN 1,879,474
FILTRATION OF SUSPENDED SEDIMENTS
Filed Nov. 7, 1930 2 Sheets-Sheet 2
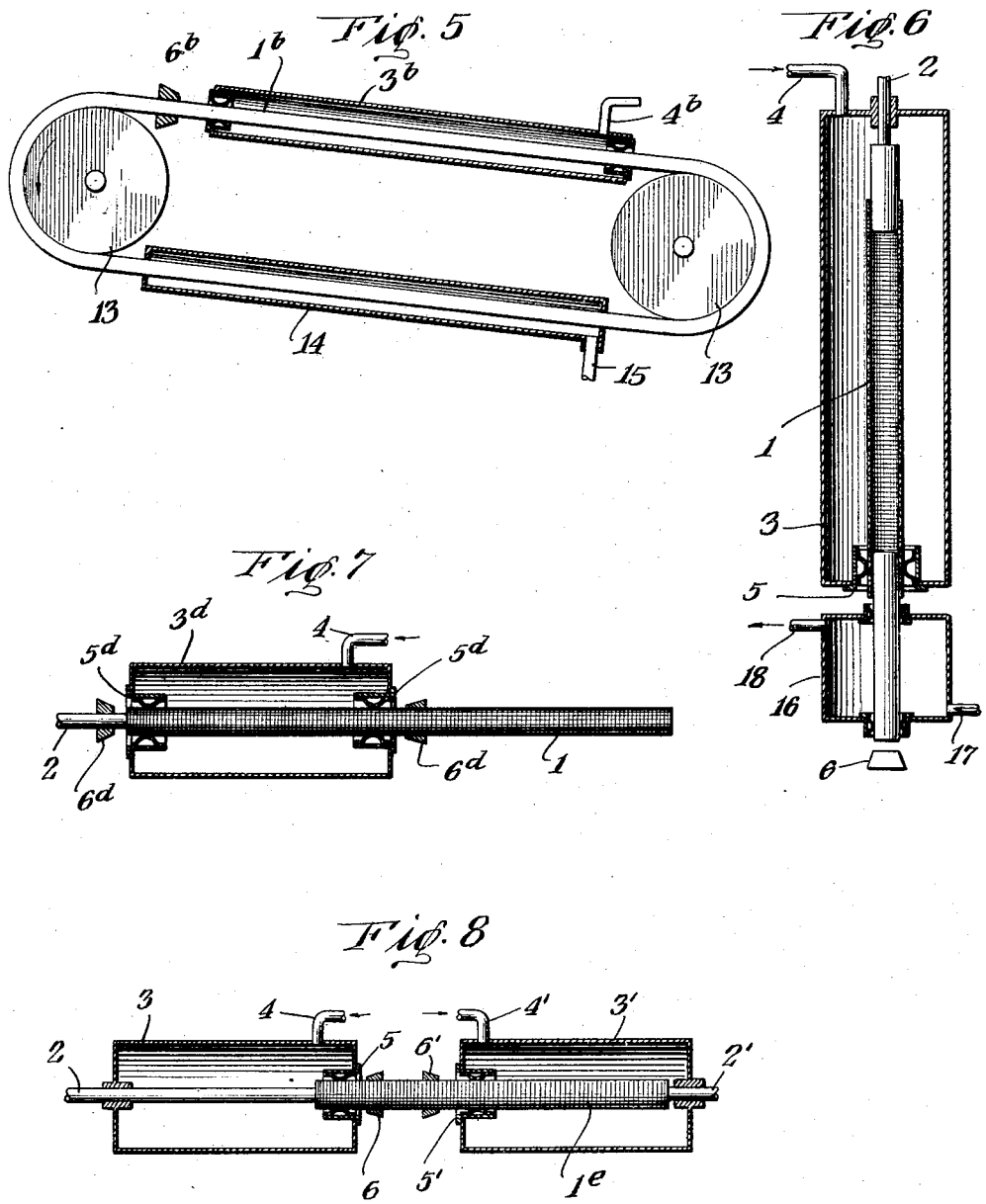

Patented Sept. 27, 1932

1,879,474

UNITED STATES PATENT OFFICE

CARL PONTOPPIDAN, OF HOLTE, DENMARK, ASSIGNOR TO F. L. SMIDTH & CO., OF NEW YORK, N. Y., A CORPORATION OF NEW JERSEY

FILTRATION OF SUSPENDED SEDIMENTS

Application filed November 7, 1930, Serial No. 493,976, and in Great Britain November 11, 1929.

The removal of a portion of the liquid from suspended sediments or sludge by subjecting the sludge to a pressure applied so as to force the liquid from the solid matter through a filter body, on the surface of which will be formed filter cake of less watery material, is well known. Such pressure filtering is usually effected by introducing the filter body into a closed sludge container, which is then subjected to pressure by admitting compressed air to the container. Heretofore the filter body has been introduced into the pressure tank through openings provided with air-tight closing devices, which have to be opened and closed whenever the filter body is inserted or withdrawn. This is troublesome. Another difficulty is that the surface of the filter cake will always be coated with a layer of unfiltered sludge, which can be removed only in part, as by rinsing the surface of the filter cake with water or otherwise. This difficulty can be overcome to some extent by subjecting the tank again to pressure, after the tank has been subjected to the pressure used for the filtering, and after all the liquid sludge has been removed from the tank. This, however, is a rather complicated procedure.

In accordance with the present invention the pressure filtering of suspended sediments is effected in such a manner that the filter body, on which the sludge cake is formed, is moved into and out from the pressure tank through a packing device in the nature of a stuffing box, which, during both motions, prevents the sludge contained in the tank from escaping and, at the same time, while the filter body is being withdrawn from the pressure tank, scrapes away the layer of sludge adhering to the surface of the filter cake. Through the construction of the packing device to be described, this can be acccomplished even when the sludge in the pressure tank is subjected to pressure during the withdrawal of the filter body, and it will, therefore, be practicable to let the filter work continuously.

In the drawings in which several embodiments of the invention are illustrated,

Figure 1 illustrates diagrammatically and in longitudinal section one such embodiment.

Figures 2, 3 and 4 illustrate in longitudinal section three slightly different constructions of a packing device adapted for the practice of the invention.

Figure 5 illustrates diagrammatically and in longitudinal section an embodiment of the invention adapted for continuous operation.

Figure 6 is a view similar to Figure 1 but illustrating a further embodiment of the invention, and Figures 7 and 8 illustrate diagrammatically and in longitudinal section other embodiments in which the filter body moves in both directions.

In the simple form of pressure filter device shown in Figures 1 and 2, the filter body proper consists of a perforated pipe 1 of any suitable cross section covered with filter cloth shown at 1ª in Figure 2. This pipe is arranged in such a manner that it can be pushed from and pulled into the pressure tank 3 by means of a piston rod 2, the sludge to be filtered being introduced into the tank through a pipe 4. After the filter body has been moved into the pressure tank, the latter is subjected to the pressure of compressed air which may be admitted from any suitable source as through the pipe 4. Thereby the sludge liquid will be pressed through the filter cloth and into the cavity of the pipe and will escape by way of the end of the pipe. In this way a filter cake will be formed on the outside of the filter cloth and when this cake has attained a predetermined thickness the filter body is forced from the tank through the packing or stuffing box 5, which is sufficiently resilient to allow the pipe with the cake deposited thereon to pass through. The movement may be effected while the pressure tank is still under pressure, provided that the stuffing box 5 be arranged to resist this pressure; but the pressure may also be reduced or entirely removed before the withdrawal. In any case the sludge adhering to the surface of the filter cake is scraped away by the packing box at the outlet opening during the movement. The filter cake itself may be removed from the filter cloth during the movement of the filter body by means of a scraper 6 disposed outside of the tank, and the removal of the filter cake will be facilitated if the interior cavity of the filter body is then subjected to a slight air pressure, whereby the filter cake will be loosened from the cloth.

Figure 2 shows one construction of the packing which as here shown consists of an annular collar 7 fitted on the inside with a rubber ring 8, which by means of a pressure pipe 9 inserted through the collar 7 can be subjected to a suitable inward pressure, whereby the rubber ring will be caused to fit tightly against the filter body, either with or without any filter cake adhering thereto. This pressure can be regulated in such a manner that the filter body can be moved out from the pressure tank without any unfiltered sludge following along.

The packing may also be constructed as shown in Figure 3, where the collar 7ª of the stuffing box is fitted with one or more openings 10 through which the sludge pressure in the tank 3 is permitted to act on both sides of the rubber ring 8, which consequently fits so tightly against the filter body that any unfiltered sludge will be removed. Instead of being made of rubber the ring 8, in this and the other constructions, may be made from any other sufficiently resilient material. Tightness against the pressure in the pressure tank 3 during the filtering process is secured by the filter body 1 being fitted, at its free end, with a flange 11 with packing 11', which rests tightly against the wall of the pressure tank when the filter body is pulled home into the pressure tank.

Instead of being made of flexible material, as supposed in the constructions shown in Figures 2 and 3, the stuffing box may be constructed in similar manner as those used in certain other machines and usually consist of a ring or plate of flexible material which by pressure from both sides is pressed inward against the moving member. Otherwise the packing and, incidentally, the removal of the unfiltered sludge, may be effected by means of a device resembling somewhat an iris stop, the stuffing box opening being thereby adjustable in definite manner corresponding to the pressure in the inside of the pressure tank and to the thickness of the filter cake.

Where the pressure in the sludge tank is very low or nearly equals atmospheric pressure the packing box, as shown in Figure 4, may be constructed as a rigid ring or collar 12 of such a shape and size that it will fit closely around the filter cake and therefore will remove the unfiltered sludge from the filter cake as the filter body is moved out of the tank. The filter body 1 is shown here, as in Figure 3, as fitted with a tightening flange 11.

Figure 5 shows an embodiment of the invention by which the filtering may be effected continuously. The filter body 1ᵇ consists of an endless flexible belt or hose or flexible body such as a steel hose, and is guided and moved by rotary wheels or drums 13, which move the body continuously through the pressure tank 3ᵇ. The latter is fitted, at the ends, with packings of a construction similar to that shown in Figure 2. The sludge is supplied to the pressure tank by way of a pipe 4ᵇ, and is subjected to a constant and uniform pressure in the tank 3ᵇ. The liquid removed by filtering passes into the interior of the filter body and escapes subsequently by way of the filter cloth, after the scraper 6ᵇ has scraped the filter cake away. The filtered liquid is caught by a trough 14, from which it is removed by way of an outlet 15.

The embodiment illustrated in Figure 6 differs from the one shown in Figure 1 in that the filter body with the wet filter cake adhering thereto, after having left the pressure tank 3, passes through a chamber 16 containing air or gases under pressure, which gases further remove a certain quantity of liquid from the filter cake and may be of such a nature that they also exert a chemical or physical action on the filter cake, in which case a current of air or gas may be directed continuously through the chamber 16 by way of pipes 17 and 18, jointed thereto. By use of hot air, with or without essential excess pressure, a drying of the filter cake may be attained. Through the chamber 16 the filter body, with the filter cake adhering thereto, is moved out, and the cake is then scraped off by means of a scraper 6 disposed outside of the chamber.

Figure 7 shows an arrangement by which the filtering may be effected continuously, although the filter body here is reciprocated as in the arrangement shown in Figure 1. The pressure tank 3ᵈ is here shown as fitted at both ends with packing devices 5ᵈ encircling the filter body 1 and serving to remove the unfiltered sludge from the filter cake. Outside of the pressure tank there is provided at each end a scraper 6ᵈ serving to scrape the filter cake from the filter body, and by a continued reciprocating motion of the filter body a continuous filtering is attained.

A continuously operating reciprocating filter may also be constructed as shown in Figure 8, where the filter body 1ᵉ enters alternately into two pressure tanks of the construction shown in Figure 1.

The motion of the filter body may be effected in any convenient manner and instead of being of circular cross-section the filter body may be of any other cross-section, such as oval, polygonal, etc. The required relative motion of the filter body and the pressure tank may also be effected by moving the tank instead of the filter body. During the filtering the interior of the filter body may be subjected to suction, whereby the differential pressure on the two sides of the filter cloth and therefore also the rapidity of the filtering process will be increased.

I claim as my invention:

1. Apparatus for filtering suspended sediments which comprises a hollow filter body, a pressure tank to receive the suspended sediments and provided with an opening through which the filter body may be introduced into the tank and removed therefrom, and a stuffing box in operative relation with said opening and adapted in the removal of the filter body from the pressure tank to remove the coating of suspended sediment from the surface of the filter cake formed on the filter body.

2. Apparatus for filtering suspended sediments which comprises a hollow filter body, a pressure tank to receive the suspended sediments and provided with an opening through which the filter body may be introduced into the tank and removed therefrom, means to remove the filtrate from the hollow filter body, whereby a filter cake is formed on the external surface thereof, a stuffing box in operative relation with said opening and arranged to coact with the filter body as it is removed from the tank, and a scraper outside of the tank and arranged to coact with the filter body as it is removed from the tank and scrape the filter cake therefrom.

3. Apparatus for filtering suspended sediments which comprises a hollow filter body, a pressure tank to receive the suspended sediments and provided with an opening through which the filter body may be introduced into the tank and removed therefrom, a stuffing box in operative relation with said opening and adapted in the removal of the filter body from the pressure tank to remove the coating of suspended sediment from the surface of the filter cake formed on the filter body, and a separate closed chamber provided with openings through which the filter body with the filter cake is passed as the filter body is removed from the pressure tank.

4. Apparatus for filtering suspended sediments which comprises a hollow filter body, a pressure tank to receive the suspended sediments and provided with an opening through which the filter body may be introduced into the tank and removed therefrom, a stuffing box in operative relation with said opening and adapted in the removal of the filter body from the pressure tank to remove the coating of suspended sediment from the surface of the filter cake formed on the filter body, and a scraper arranged for coaction with the filter body as the filter body is passed through said chamber to scrape the filter cake from the filter body.

5. Apparatus for filtering suspended sediments which comprises an endless hollow filter body, means to support the same and cause it to travel, a pressure tank to receive the suspended sediments and provided with openings through which the filter body passes in its movement through the tank, and stuffing boxes in operative relation with said openings and adapted in the movement of the filter body through the tank to remove the coating of suspended sediment from the surface of the filter cake formed on the filter body.

6. Apparatus for filtering suspended sediments which comprises a hollow filter body, a pressure tank to receive the suspended sediments and provided with an opening through which the filter body may be introduced into the tank and removed therefrom, and a stuffing box in operative relation with said opening and formed with a member to engage the filter body yieldingly, whereby in the removal of the filter body from the pressure tank the coating of suspended sediment is removed from the surface of the filter cake formed on the filter body.

This specification signed this 17th day of October A. D. 1930.

CARL PONTOPPIDAN.